July 24, 1951  T. S. GORTON  2,561,359
INSTRUMENT FOR DEVEINING AND SHELLING SHRIMP
Filed Aug. 18, 1949  2 Sheets-Sheet 1
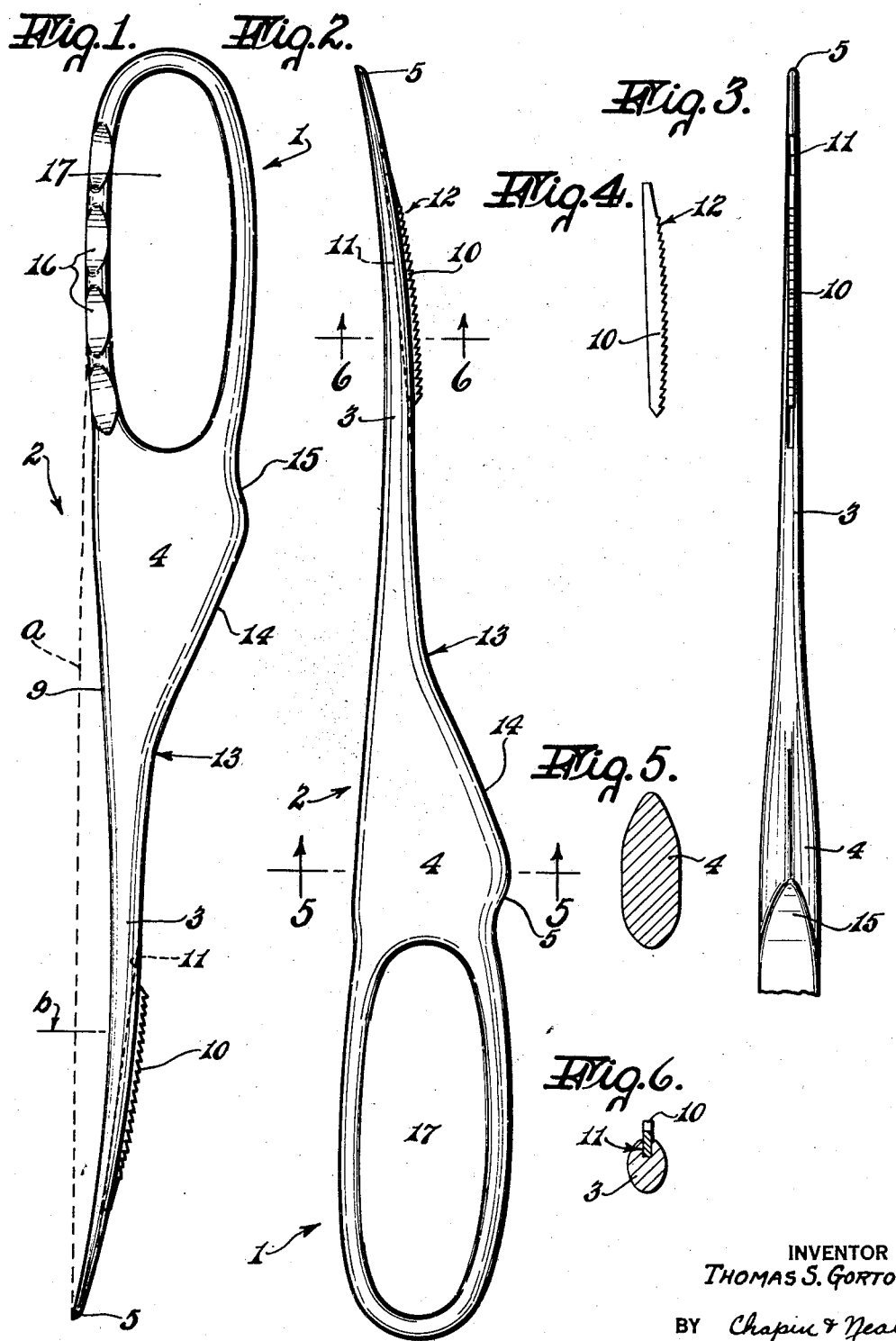
INVENTOR
THOMAS S. GORTON
BY Chapin & Neal
ATTORNEYS July 24, 1951        T. S. GORTON        2,561,359
INSTRUMENT FOR DEVEINING AND SHELLING SHRIMP
Filed Aug. 18, 1949        2 Sheets—Sheet 2
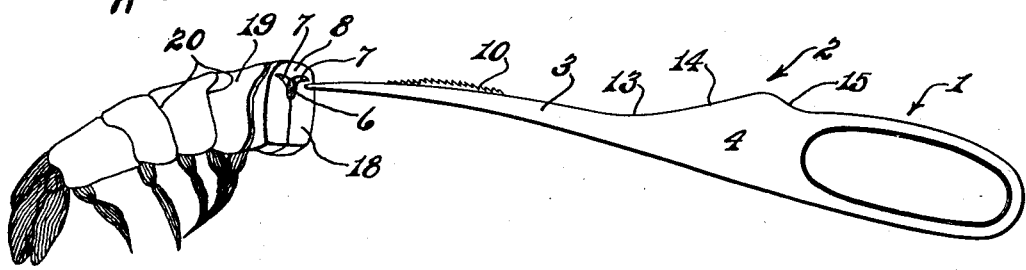
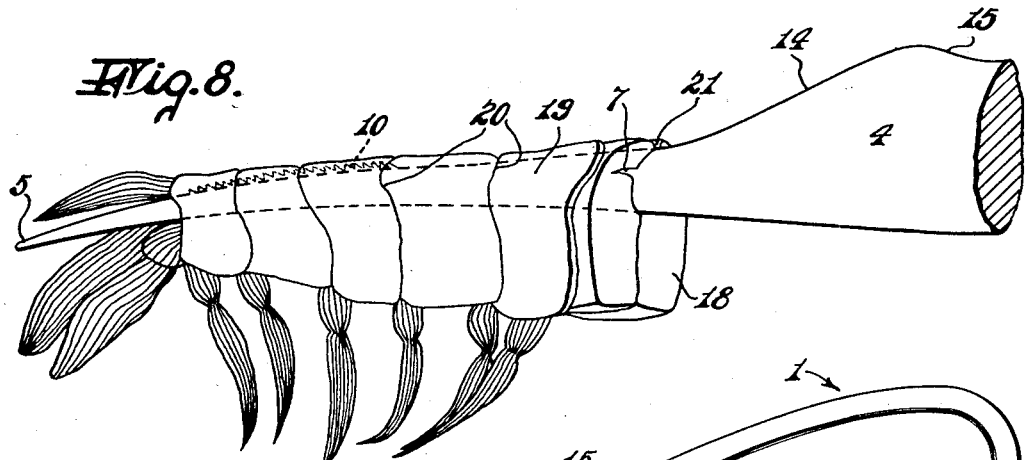
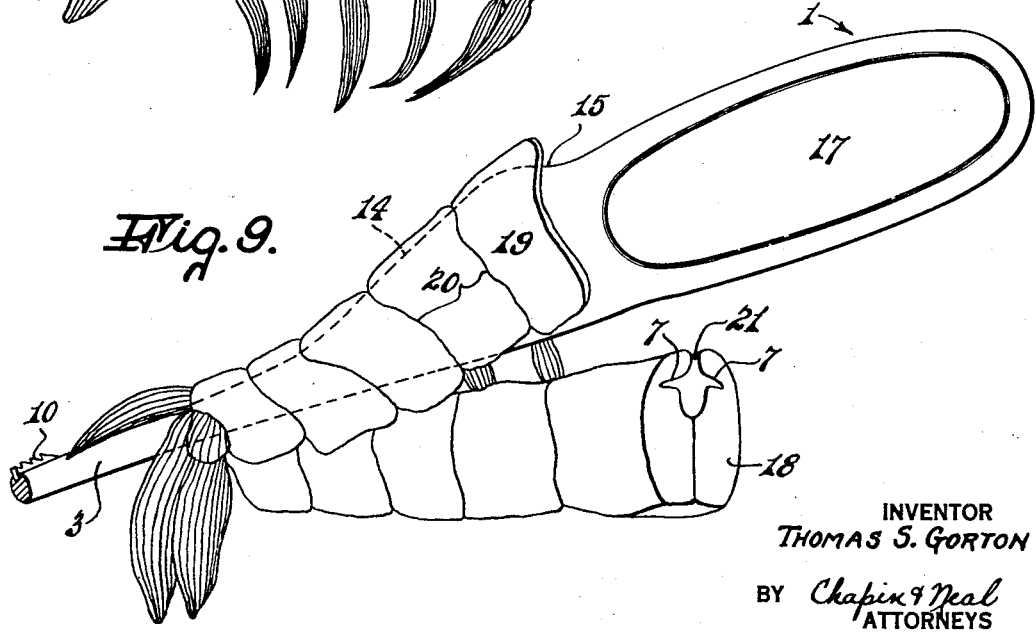
INVENTOR
THOMAS S. GORTON
BY Chapin & Neal
ATTORNEYS Patented July 24, 1951

2,561,359

UNITED STATES PATENT OFFICE 2,561,359

INSTRUMENT FOR DEVEINING AND SHELLING SHRIMP

Thomas S. Gorton, Evanston, Ill.

Application August 18, 1949, Serial No. 110,933

4 Claims. (Cl. 17—7)

This invention relates to an improved instrument for de-veining and shelling shrimp from which the head has been removed.

An object of the invention is to provide an instrument, convenient and easy to handle, which will save at least 10% more meat than any prior art hand operated shrimp de-veining and shelling device now known to me.

Another object of the invention is to provide an instrument which will not mangle or tear meat but will neatly cut it between the vein cavity and the shell, leaving the meat in one piece.

A further object of the invention is to provide an instrument of long shallow curvature to sever shoulder meat and particularly in the last joint of the shrimp as well as in all other joints so as to have all of the meat capable of being easily detached from the shell.

Another object of the invention is to provide an instrument which lifts the shell from the shrimp after the shoulder meat is severed in contrast to forcing the meat away from the shell and thereby mashing the meat during shell removal.

It is also an object of this invention to provide an instrument which will easily and efficiently de-vein soft shelled shrimp and permit the ready removal of the shell without mangling and tearing the shrimp flesh.

These and other objects and advantages will become apparent from the following description and the accompanying drawings.

In the drawings:

Fig. 1 is a side view in full scale of a shrimp de-veiner and shell removing device constructed in accordance with my invention;

Fig. 2 is a view of the opposite side;

Fig. 3 is a top plan of the tool portion of the device;

Fig. 4 is a side view of the detachable saw blade as removed from the device shown by Figs. 1–3;

Fig. 5 is a cross section taken on line 5—5 of Fig. 2;

Fig. 6 is a cross section taken on line 6—6 of Fig. 2;

Fig. 7 is a pictorial view showing the first step in the use of the instrument;

Fig. 8 is a similar view showing the instrument pushed into a shrimp and before the lifting of the shell away from the flesh takes place in the operation; and Fig. 9 is a view showing the shell lifted from the meat in the final operation of the device.

The form of the device as disclosed in the drawings comprises a handle portion 1 and a tool portion 2 with an outer elongated tapering blade member 3 and an intermediate shank member 4. The slender blade 3 with its gradually reduced cross section tapering to a point at the tip end 5 is for entering the vein cavity at the fore end of a de-headed shrimp and cutting the shoulder meat between the cavity and the center line of the shrimp along its back as will be described. The intermediate shank portion 4 is for lifting the shell away from the flesh of the shrimp after a cut has been made by insertion of the blade member.

In describing the instrument and its operation reference is made to the shoulder meat of the shrimp. As will be recognized by Figs. 7–9, the vein or sand vein 6 of a de-headed shrimp with viscera cavities 7 branching at each side thereof runs longitudinally of the shrimp body in its upper portion. Above the vein and extending at each side to overlie the ends of the viscera cavities is a portion of meat referred to herein as the shoulder meat of the shrimp.

Referring to Figs. 1 and 2 it will be noted that the lower edge 9 of the device is formed with a shallow curvature. As indicated by the dotted line $a$, connecting the tip end of the blade and the handle and tangent to the lower edge thereof a chord of a circle is roughly formed with the base of the tool with the maximum height of the chord being about $\frac{5}{16}$ inches as at $b$. At $b$ it will be noted the blade portion is curved downwardly for the remaining two and one half inches more or less of the blade end.

On the top edge of the blade is provided a saw tooth piece 10 approximately two inches in length with its rearward end about three inches from the end of the blade tip. As shown by the drawings, the saw blade is removably seated in a recessed longitudinal slot 11 in the metal of the blade. The blade is inserted in place in its recess as by a press fit and is replaceable.

Preferably, the teeth of the saw blade are forwardly slanting and of triangular design when viewed as in Fig. 4. There is no set on the edges of the teeth. A saw insert of hardened steel similar to a rip saw with no set on the teeth and with fifteen teeth to the inch has been found most satisfactory in actual practice. It will be further noted that the first four or five teeth at the fore part of the saw, as at 12 are graduated and that the entire saw edge is slightly arcuate in formation. The advantages of these details in the preferred form will be later described in connection with the operation of the device.

The tapered design of the blade member 3 is shown by Figs. 1–3 and it will be noted from Fig. 6 that the major cross sectional axis of the member 3 is disposed from top edge to bottom edge and the minor axis laterally of the tool. The blade member is approximately five inches or over in length with the downward curving of the shallow arcuate base line of the tool commencing in the forward portion of the tool as at the location $b$.

The lower edge 9 of the device between the blade member and the shank member is the continuation of the shallow arc as described. The upper or top edge of the tool portion is divided as at 13 to provide an upwardly angled inclined surface 14 on the shank portion and corresponding roughly to the hypotenuse of a right triangle. As shown, a rearwardly directed surface 14 forming an inclined plane from the top edge of the blade and at an angle of approximately 30° to the longitudinal center line of the shank is preferred. In Fig. 5 the shank at its inner end is shown in cross section. The elliptically shouldered surfaces of the shank provide for the progressive lifting of the shell away from the meat of the shrimp. The dimension of the tool portion from the peak of the shank to the blade tip is approximately seven inches.

At the top of the handle adjacent the shank portion an abrupt depression is provided for a thumb rest 15 in using the device. As shown by Fig. 1, finger gripping grooves 16 are provided on the bottom edge and the handle is recessed as at 17 on each side thereof.

The device as drawn to scale in Figs. 1–6 and with the preferred dimensions as stated is designed for use in connection with larger shrimp, known in the trade as jumbo size shrimp. Such shrimp when de-headed will measure in the neighborhood of four to five inches. It will be readily appreciated that for use on the smaller sizes of shrimp the dimensions of the device may be reduced proportionately and operate with satisfactory results. A removable saw tooth piece as 10 and of hardened steel is preferred. An integral saw tooth raised on the outer portion of the blade 3 could be utilized according to this invention.

Referring now to Figs. 7 to 9 inclusive the device is shown first with the tip end directed for insertion in the vein cavity of the shrimp with the body meat of the shrimp indicated at 18 and the shell at 19. The shell is jointed at 20 and as will be recognized the shrimp normally assumes an inherent curvature. In using the tool the shrimp is straightened in the palm of the left hand with the operator's thumb pressing down on the back of the shrimp while inserting the tool through the vein in the manner indicated by Fig. 8.

It will be realized by comparing Figs. 7 and 8 that the tip of the blade should be inserted into the viscera channel next to the vein and pushed forward for several inches until the saw blade begins to contact the shoulder meat at the top center line of the vein cavity 6. If by chance the tip is inserted into the vein, the tip will break right out so that the blade is alongside the vein. As the saw is further inserted the meat is severed a shown at 21 in Fig. 8. The further insertion of the blade is accomplished with a gradual severance of the shoulder meat with the downward curvature of the fore end of the blade following the slight curvature of the shrimp vein. The graduated saw teeth as at 12 insure against too abrupt a cutting action and possible tearing of a normal shell, so that the entire shell generally remains intact as shown by Figs. 8 and 9. It is desirable to leave the shell intact and I have found that a saw tooth arrangement with no set on the teeth as above described does not tend to sever the shell so readily as would a sharp knife edge.

It will be seen also that further pushing of the tool portion will cause the saw teeth to sever the shoulder meat contained in the upper portion of the last joint. Often the meat in said last joint is lost in the process of de-veining shrimp as the vein is curved in a slight angular downward direction in the joint. With the new device the knife cuts the meat neatly and permits the lifting of the shell as shown by Fig. 9.

In the position of Fig. 8 the operator may grasp the last joint between thumb and index finger to insure the most satisfactory results in operation. The severing action is aided by the cross sectional formation of the blade with the vertical axis of the blade being of greater dimension than the lateral axis of the same. The flesh of the shrimp is delicate and easily torn. With the major axis of the tool blade vertical the tension on the flesh around the vein is exerted for a better vertical severance rather than laterally pressing at each side of the vein. As shown by the drawings, the long slender blade 3 is gradually tapered both in cross sectional width and height down to the tip 5 which helps to prevent the blade from "rolling" in the vein. It will be apparent from Figs. 7, 8 and 9 that the outside tip of the viscera cavities are closely adjacent the outer or lower edge portions of the shoulder meat portion. If the flesh is strained laterally in these sections a break can easily occur to tear the flesh in which case parts of the shoulder meat are either mangled and torn from the main body of flesh and are wasted or such parts are left with a thin point of connection to the main body which will separate in the washing process and thus the parts are lost.

The tip end of the blade in Fig. 8 protrudes from the shrimp below its upper or "spear" tail and as the tool is pushed to the position of Fig. 9 the shell is lifted on the ramp or incline 14 of the shank lifting portion as shown. The shell progressively peels away from the meat which is left intact with the shoulder meat severed along the top mid-line and joined at each side to the flesh of the body. Ordinarily in operation of the tool the spear tail of the shrimp is left hanging to the flesh. This may be pinched off by hand and the vein washed out under running water.

Severance of the shoulder meat as disclosed herein has an additional advantage in de-veining the shrimp when shrimp with roe are being handled. The roe lies along the viscera cavities and when the shoulder meat is cut and the vein cavity laid open for removal thereof the roe can be easily removed with the vein as by placing under running water. There is then no necessity for the roe or vein to become tangled up in mangled or torn bits of shoulder meat.

A normally hard shelled shrimp will be deveined and the shell removed as above described. In the case of a shrimp with a soft shell the saw tooth member will sever the shell along the midline of the shrimp blade. The shell will be parted centrally by the shell lifting portion 4 and the cut edge of each half will be moved laterally away from the shoulder meat so that each half of the shell will be preserved intact and may be peeled away from the flesh manually. In any event, the meat is preserved in one piece without tearing or mangling by the instrument and the shoulder meat laid open for vein removal.

The instrument of this invention cuts the shrimp including the soft shell shrimp in such a way that the shrimp when cooked have the same attractive appearance as a hand processed shrimp. In the usual hand cleaning operation shrimp are first shelled by carefully breaking open the shell with the fingers of both hands and removing the meat as intact as possible. Then the shrimp meat is de-veined by laying the same on a board and drawing a sharp blade of a small knife down the entire back of the shrimp. This lays the vein cavity open to leave it exposed for brushing or washing out. The shoulder meat is thus divided in tow firmly attached parts, half on each side of the shrimp. In cooking a slight shrinking occurs causing the shoulder meat ridges to curl back and the cooked shrimp has a clean white strip exposed between two pink sides. By use of my invention as described the shrimp is very quickly prepared and the attractive appearance of the meat in the finished cooked product is preserved.

Having described my invention, I claim:

1. An instrument for de-veining and removing the shell from a de-headed shrimp, comprising a handle portion and an elongated arcuate tool portion extending forwardly from said handle portion, said tool portion having a generally elliptical cross section throughout its length and being of gradually tapered conformation with a relatively long slender viscera cavity pentrating needle prong end portion at the forward free end thereof, a longitudinal cutting edge on said tool portion and extending in the plane of its major elliptical axis on the convex surface of the arcuate tool portion, the forward end of said cutting edge being spaced from the free end of the needle end portion whereby the needle end portion is fully penetrable into a viscera cavity of a de-headed shrimp to guide the cutting edge of the tool portion through the cavity for severance of the shrimp flesh to the shell, the maximum dimensions of the cross sectional axes of said tapered elliptical tool portion being rearwardly of said cutting edge to part the shrimp flesh severed thereby.

2. An instrument for de-veining and removing the shell from de-headed shrimp, comprising a handle portion and an elongated tool portion of elliptical cross section throughout extending forwardly from said handle portion, said tool portion having an elongated blade of gradually tapered conformation spaced from the handle with a relatively long slender viscera cavity penetrating needle prong end portion at the forward free end thereof, a longitudinal cutting edge on the convex surface of the blade extending in the plane of the major elliptical axis of the tool portion, said cutting edge being spaced on the blade from the tip of the needle end portion whereby the needle end portion is fully penetrable into a viscera cavity of a de-headed shrimp to guide said cutting edge and tool portion through the cavity, the maximum dimensions of the elliptical cross sectional axes of the tool portion being rearwardly of said cutting edge to spread apart the viscera cavity and shrimp flesh severed by the cutting edge to the shell, and said tool portion including a shell lifting portion aligned with said cutting edge and extending in the same directional plane with a relatively sharply inclined surface joining the handle portion, said shell lifting portion being spaced from the cutting edge and in the part of the tool portion having the maximum cross sectional dimensions, said lifting portion being positioned to bear against the underside of a shell exposed to it by the cutting edge and blade portion to lift the shell away from the meat of the shrimp as the tool is forced through a viscera cavity.

3. An instrument for de-veining and removing the shell from de-headed shrimp, comprising a handle portion and a tool portion of elliptical cross section throughout including an elongated blade of generally uniform taper spaced from the handle and curved in a shallow arc, said blade having a long viscera cavity penetrating needle end portion at the forward end thereof, saw teeth on said blade extending in the plane of the major cross sectional axes of the tool portion on the convex edge surface thereof, said saw teeth being spaced on the blade substantially behind said needle point whereby the needle end portion is fully penetrable into a viscera cavity of a de-headed shrimp before engaging the saw teeth so as to guide said teeth through the cavity, the maximum dimensions of the elliptical cross sectional axes of the tool portion being rearwardly of said saw teeth to spread apart the viscera cavity and shrimp flesh severed by the cutting edge to the shell, and said tool portion including a shell lifting portion aligned with the saw teeth and extending in the same directional plane, said shell lifting portion being spaced from the saw teeth and in the part of the tool portion having the maximum cross sectional dimensions and positioned to bear against the underside of a shell exposed to it by the saw teeth and tapering tool portion to lift off the shell as the tool is forced through a viscera cavity.

4. An instrument for de-veining and removing the shell from de-headed shrimp, comprising a handle portion and a tool portion of elliptical cross section having an elongated blade of generally uniform taper and curved in a shallow arc, said blade having a long viscera cavity penetrating needle end portion, a saw toothed piece on said blade extending in the plane of the major cross sectional axes of the tool portion and arcuately over-lying the convex surface of said blade, the teeth of said piece being aligned with the first several teeth thereof adjacent said needle point portion being graduated, said saw toothed piece being spaced on the blade substantially behind the tip end of said needle end portion whereby the needle end portion is fully penetrable into a viscera cavity of a de-headed shrimp before the saw toothed piece to guide the blade through the cavity, the maximum dimensions of the elliptical cross sectional axes of the tool portion being rearwardly of said saw toothed piece to spread apart the viscera cavity and shrimp flesh severed by the saw toothed piece to the shell, and a shell lifting portion aligned with the saw toothed piece and extending in the same directional plane, said shell lifting portion being spaced from the saw toothed piece and in the part of the tool portion having the maximum cross sectional dimensions and positioned to bear against the underside of a shell exposed to it by the saw toothed piece and tapering tool portion to lift off the shell as the tool is forced through a viscera cavity.

THOMAS S. GORTON.

REFERENCES CITED

The following references are of record in the file of this patent:

UNITED STATES PATENTS

| Number | Name | Date |
|---|---|---|
| 1,362,143 | Rohrer | Dec. 14, 1920 |
| 1,564,105 | Ouellet | Dec. 1, 1925 |
| 1,788,656 | Brown | Jan. 13, 1931 |